M. PETTIT.
CHILD'S VEHICLE.
APPLICATION FILED SEPT. 5, 1911.

1,022,698.

Patented Apr. 9, 1912.

Witnesses
Victor E. Jullien
Geo. Johnson

Inventor
Morgan Pettit.
by James W. See
Attorney

UNITED STATES PATENT OFFICE.

MORGAN PETTIT, OF CONNERSVILLE, INDIANA.

CHILD'S VEHICLE.

1,022,698.

Specification of Letters Patent.

Patented Apr. 9, 1912.

Application filed September 5, 1911. Serial No. 647,563.

*To all whom it may concern:*

Be it known that I, MORGAN PETTIT, a citizen of the United States, residing at Connersville, Fayette county, Indiana, have invented certain new and useful Improvements in a Child's Vehicle, of which the following is a specification.

This invention pertains to improvements in the front-propelled class of children's vehicles, and the present improvements will be readily understood from the following description taken in connection with the accompanying drawing in which:—

Figure 1:
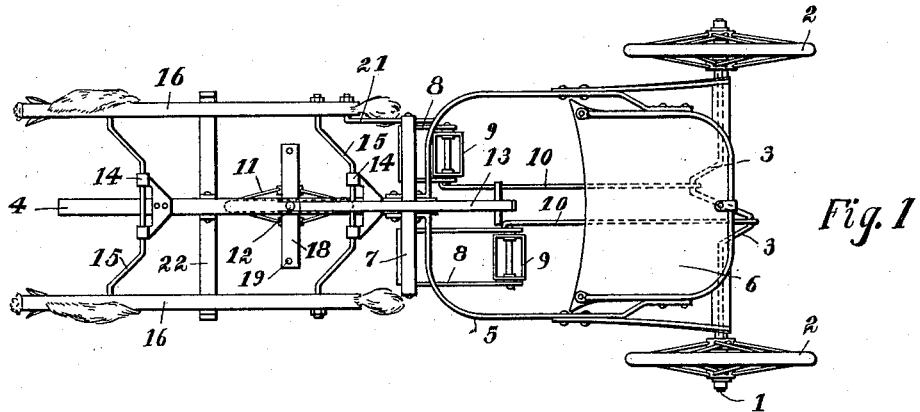
Figure 2:
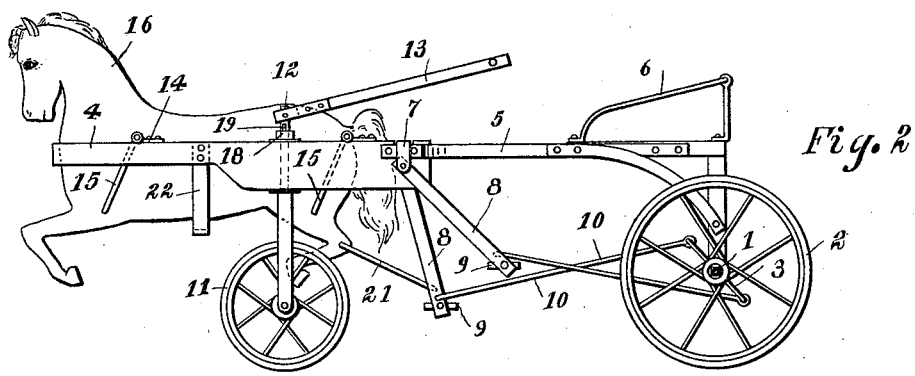
Figure 3:
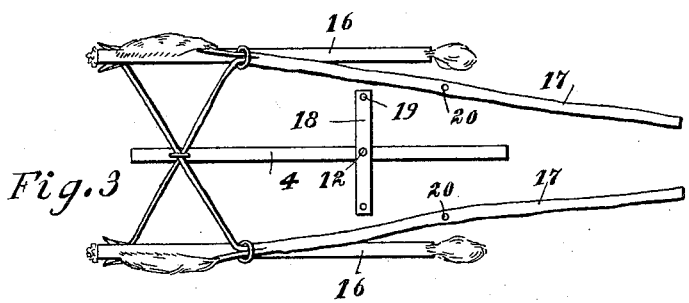
Figure 4:
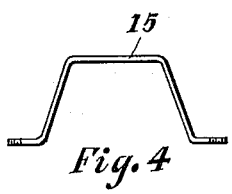
Figure 5:
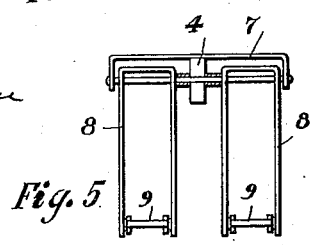

Figure 1 is a plan of a child's vehicle embodying an exemplification of my improvements, the reins being omitted from this view in order to avoid obscuring other parts: Fig. 2 a side elevation of the same, one horse of the team being omitted: Fig. 3 a plan of the team and reins: Fig. 4 a rear elevation of one of the horse suspenders: and Fig. 5 a rear elevation of the treadle swings.

In the drawing:—1, indicates the axle: 2, the traction wheels fast thereon: 3, oppositely disposed cranks formed in the axle: 4, a tongue: 5, hounds extending back from the tongue and serving to connect the tongue with the axle: 6, a seat secured over the axle, the axle, tongue, hounds and seat forming a vehicle frame: 7, a cross-bar over the rear end of the tongue: 8, a pair of rectangular pedal-swings suspended from a horizontal pivot supported by cross-bar 7: 9, pedals carried by the lower end of the pedal-swings, the pedal-swings being in such position that a child upon the seat can readily reach and operate the two pedals with his feet: 10, links connecting the lower portions of the pedal-swings with the cranks of the axle: 11, a steering wheel swiveled below an intermediate portion of the length of the tongue: 12, the steering spindle vertically pivoted in the tongue and forming the vertical axis of steering: and 13, a steering lever connected with the upper end of the steering spindle and extending back to within reach of the child upon the seat.

The child upon the seat may, by operating the pedals, propel the vehicle forward, and by operating the steering lever may steer it as desired, in an obvious manner. The construction of the pedal-swings is such as to permit economical construction along with the high degree of substantiability desirable in the motion-work of a vehicle subject to the usual rough and tumble treatment accorded them by careless children, the disposition of the parts of the frame and motion-work being also such as to provide plenty of room for the child's legs outside the links 10 and within the hounds of the frame.

Continuing with the drawing:—14, indicates bearings secured to the front and rear portions of the tongue, their axes extending crosswise of the vehicle: 15, suspenders freely pivoted in these bearings and having outwardly projecting journals at their lower ends: 16, dummy horses disposed beside the tongue and having bearings in their bodies engaging the journals of the suspenders, the feet of the horses being at all times free of the ground: 17, reins leading from the horses' heads back to within reach of the rider on the seat: 18, transverse steering lever fast on the steering spindle: 19, pins projecting upwardly from the ends of the transverse steering lever: 20, holes in the reins adapted to engage the pins 19: 21, a link detachably connecting one of the treadle-swings with one of the horses: and 22, a safety cross-bar supported by the tongue and projecting out under but always free from the bellies of the horses, this cross-bar having upturned outer ends.

The horses are preferably mere ornamented thin wooden silhouettes.

Assume the rider to be traveling forward and that the reins are disengaged from transverse steering lever 18, and assume link 21 to be disconnected. The rider may, by pulling on the reins, give the horses a fore and aft motion simulating liveliness on their part, and the quickness with which they thus move is entirely under the rider's control. The rider, in giving this lively motion to the horses may control the reins with one hand and steer lever 13 with the other hand. In case the horses need to pass over an obstruction likely to do injury to their legs the rider may pull the horses very far back so that the suspenders will elevate the horses out of harm's way. If, now, link 21 be connected up for duty the horses will be automatically given their fore and aft motion and the reins will be inert so far as the control of this motion is concerned, the rate of the horses' swinging motion being directly proportioned to the forward speed of the vehicle. If the holes 20 in the reins be now engaged with the pins 19 of the transverse steering lever the steering may be done by the reins entirely and steering lever 13 may be disconnected from the steering spindle or merely left idle. This steering by the reins may be done regardless of whether or not link 21 is connected up for duty but if it is not connected up then the horses will have no fore and aft motion except such as they get by natural swinging as the vehicle rattles over the road. The holes 20 in the reins are far enough back to yield sufficient slack in the forward portion of the reins to avoid interference with the proper movement of the reins in turning the transverse steering lever and to avoid the fore and aft motion of the horses if the link 21 is connected. It is thus seen that a child using the vehicle may exercise a certain amount of discretion and choice in the manner of use. The cross-bar 22 is normally without office, its purpose being to give support to the horses if they or their supporting parts should break so that they tend to fall, in other words, the cross-bar forms a safety device.

While the vehicle is illustrated and described as a two-horse affair it is obvious that the same general principle of construction and motions will apply if there be but a single horse, and it will be understood that instead of horses or a horse, figures of other animals may be employed, and while economy dictates the forming of the animal-body as a mere sawed-out silhouette of wood the body may be formed in any desired manner and of any suitable material.

I claim:—

1. In a child's vehicle, the combination of a cranked axle provided with wheels, a pole, hounds connecting the pole with the axle and arranged to provide a leg space, a seat supported by the hounds and axle, an animal body, suspenders pivotally connected to the pole and to said body to movably support the latter in relation to the pole, pedal swings supported by the pole, links connecting said swings with the axle cranks and a link connecting one of the pedal swings with the animal figure.

2. In a child's vehicle, the combination of a rear axle provided with opposite cranks, a pole, pedal swings suspended from the pole, links, each connecting one of the swings with one of the cranks, an animal figure, suspenders pivoted to the pole and having downwardly dropped ends pivoted to said animal figure, a link connecting one of the pedal swings with said animal figure, a front wheel steerably mounted on the pole, and a tiller connected with said steering wheel and extending toward the driver.

3. A child's vehicle comprising, an axle provided with a double crank, traction-wheels fast thereon, a frame mounted on the axle, a seat on the frame, a cross-bar on the frame, a horizontal pivot carried by the cross-bar, a pair of pedal-swings suspended from said pivot, links connecting each of the pedal-swings with one of the axle cranks, a pair of suspenders pivoted in the frame forward of the pedal-swings and one forward of the other, an animal-body mounted on said suspenders for fore and aft motion relative to the frame, a steering-wheel steerably pivoted in the frame, and means within reach of a rider on the seat for turning said steering wheel, combined substantially as set forth.

4. A child's vehicle comprising, an axle provided with a double crank, traction wheels fast thereon, a frame mounted on the axle, a seat on the frame, a cross bar on the frame, a horizontal pivot carried by the cross-bar, a pair of pedal-swings suspended from said pivot, links connecting each of the pedal-swings with one of the axle cranks, a pair of suspenders pivoted in the frame forward of the pedal-swings and one forward of the other, an animal-body mounted on said suspenders for fore and aft motion relative to the frame, a steering-wheel steerably pivoted in the frame, means within reach of a rider on the seat for pivoting said steering wheel, and a detachable link connecting one of the pedal-swings with the animal-body, combined substantially as set forth.

5. A child's vehicle comprising, an axle provided with a double crank, traction wheels fast thereon, a frame mounted on the axle, a seat on the frame, a cross bar on the frame, a horizontal pivot carried by the cross-bar, a pair of pedal-swings suspended from said pivot, links connecting each of the pedal-swings with one of the axle-cranks, a pair of suspenders pivoted in the frame forward of the pedal-swings and one forward of the other, an animal-body mounted on the suspenders for fore and aft motion, a steering wheel vertically pivoted in the frame forward of the pedal-swings, steering means connected with the steering wheel, and a pair of reins connected with the head of the animal-body and extending within reach of a rider on the seat, combined substantially as set forth.

6. A child's vehicle comprising, an axle provided with a double crank, traction wheels fast thereon, a frame mounted on the axle, a seat on the frame, a cross bar on the frame, a horizontal pivot carried by the cross-bar, a pair of pedal-swings suspended from said pivot, links connecting each of the pedal-swings with one of the axle-cranks, a pair of suspenders pivoted in the frame forward of the pedal-swings and one forward of the other, an animal-body mounted on the suspenders for fore and aft motion, a steering wheel vertically pivoted in the frame forward of the pedal-swings, a pair of reins connected with the head of the animal-body and extending within reach of a rider on the seat, a transversely extending steering lever connected with the steering wheel, and means for connecting the reins with the ends of the steering lever, combined substantially as set forth.

7. A child's vehicle comprising, an axle provided with a double crank, traction wheels fast thereon, a frame mounted on the axle and provided with a forwardly extending tongue, a seat on the frame, a cross bar on the frame, a horizontal pivot carried by the cross-bar, a pair of pedal-swings suspended from said pivot, links connecting each of the pedal-swings with one of the axle cranks, a steering wheel pivoted in the tongue forward of the pedal-swings, a pair of suspenders pivoted to the tongue forward of the pedal-swings and one forward of the other and each having outwardly projecting journals, means within reach of a rider on the seat for pivoting the steering wheel, a pair of animal-bodies mounted on the outer end journals of the suspenders, and a pair of reins leading from the heads of the animal-bodies back to within reach of a rider on the seat, combined substantially as set forth.

8. A child's vehicle comprising, an axle provided with a double crank, traction wheels fast thereon, a frame mounted on the axle and provided with a forwardly extending tongue, a seat on the frame, a cross bar on the frame, a horizontal pivot carried by the cross-bar, a pair of pedal-swings suspended from said pivot, links connecting each of the pedal-swings with one of the axle cranks, a steering wheel steerably pivoted in the tongue forward of the pedal-swings, a pair of suspenders pivoted to the tongue forward of the pedal-swings and one forward of the other and each having outwardly projecting journals, means within reach of a rider on the seat for pivoting the steering wheel, a pair of animal-bodies mounted on the outer end journals of the suspenders, a pair of reins leading from the heads of the animal-bodies back to within reach of a rider on the seat, and a cross-bar secured to the tongue and extending sidewise under the bellies of the animal-bodies and free therefrom and provided with upturned outer ends, combined substantially as set forth.

9. A child's vehicle comprising, an axle provided with a double crank, traction-wheels fast thereon, a frame mounted on the axle, and provided with a forwardly extending tongue, a seat on the frame, a cross bar on the frame, a horizontal pivot carried by the cross-bar, a pair of pedal-swings suspended from said pivot, links connecting each of the pedal-swings with one of the axle cranks, a steering wheel steerably pivoted in the tongue forward of the pedal-swings, means within reach of a rider on the seat for pivoting the steering wheel, two pairs of bearings mounted on the tongue, a suspender mounted in each pair of bearings and provided with outwardly projecting journals, a pair of animal-bodies mounted on the outer journals of the suspenders, and a pair of reins extending from the heads of the animal-bodies back to within reach of a rider on the seat, combined substantially as set forth.

10. A child's vehicle comprising, an axle provided with a double crank, traction wheels fast thereon, a frame mounted on the axle and provided with a forwardly projecting tongue, a seat on the frame, a cross bar on the frame, a horizontal pivot carried by the cross-bar, a pair of pedal-swings suspended from said pivot, links connecting each of the pedal-swings with one of the axle cranks, a steering wheel vertically pivoted in the tongue forward of the pedal-swings, a transverse steering lever connected with the steering wheel, a pair of suspenders journaled on the tongue and provided with outwardly extending journals, a pair of animal-bodies mounted on the outer journals of the suspenders, a pair of reins extending from the heads of the animal-bodies back to within reach of a rider on the seat, and means for connecting the reins with the ends of the transverse steering lever, combined substantially as set forth.

11. A child's vehicle comprising, an axle provided with a double crank, traction wheels fast thereon, a frame mounted on the axle and provided with a forwardly extending tongue, a seat on the frame, a cross bar on the frame, a horizontal pivot carried by the cross-bar, a pair of pedal-swings suspended from said pivot, links connecting each of the pedal-swings with one of the axle cranks, a steering wheel vertically pivoted in the tongue forward of the pedal-swings, means within reach of a rider on the seat for pivoting said steering wheel, a pair of suspenders journaled on the tongue and having outwardly projecting journals, animal-bodies mounted on the end journals of the suspenders, a pair of reins extending from the heads of the animal-bodies back to within reach of a rider on the seat, and a link connecting one of the pedal-swings with one of the animal-bodies, combined substantially as set forth.

12. In a child's vehicle, the combination of a cranked rear axle, a frame, a seat thereon, pedal swings suspended from the frame, an animal body, suspenders connecting the animal body movably to the frame, a detachable link connecting one of the pedal swings with said animal body, links connecting the pedal swings with the axle cranks, a steering wheel, a fork therefor vertically pivoted in the frame, a cross bar carried by the fork, reins connected to the animal and means for attaching the reins to the ends of said cross-bar at such a point that when attached considerable slack will be present in the reins between their connection with the cross-bar and with the animal body.

13. In a child's vehicle, the combination of a cranked rear axle, a frame, a seat thereon, pedal swings suspended from the frame, an animal body, suspenders connecting the animal body movably to the frame, a detachable link connecting one of the pedal swings with said animal body, links connecting the pedal swings with the axle cranks, a steering wheel, a fork therefor vertically pivoted in the frame, a cross-bar carried by the fork, reins connected to the animal and means for attaching the reins to the ends of said cross-bar at such a point that when attached considerable slack will be present in the reins between their connection with the cross-bar and with the animal body, a steering tiller connected to the fork and extending back toward the seat.

MORGAN PETTIT.

Witnesses:
L. D. DILLMAN,
FRANK R. KIEFNER.

Copies of this patent may be obtained for five cents each, by addressing the "Commissioner of Patents. Washington, D. C."